D. G. TATUM.
RUNNING GEAR.
APPLICATION FILED MAY 5, 1911.
1,032,311. Patented July 9, 1912.
2 SHEETS—SHEET 1.
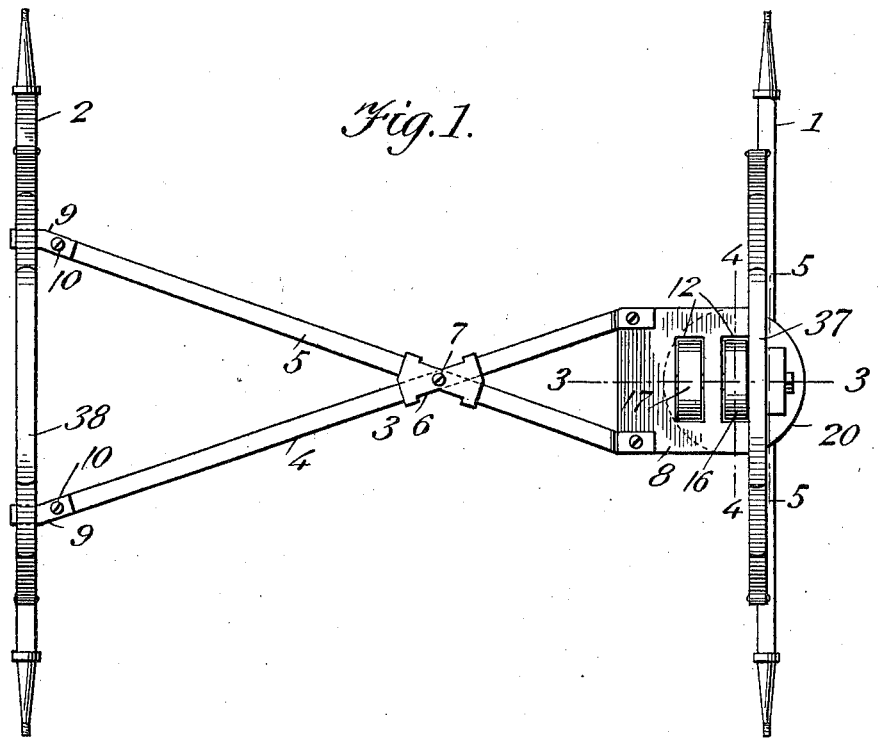
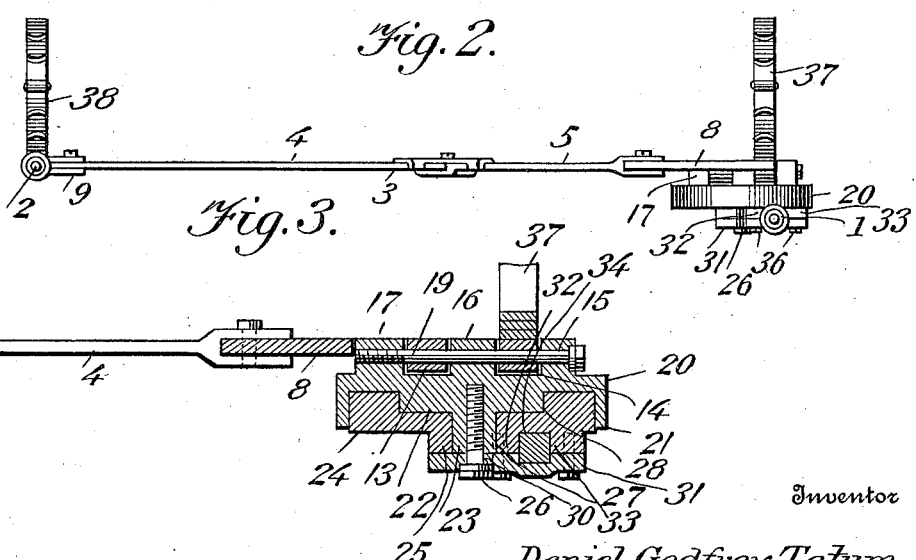
Witnesses
Inventor
Daniel Godfrey Tatum
By Victor J. Evans
Attorney D. G. TATUM.
RUNNING GEAR.
APPLICATION FILED MAY 5, 1911.
1,032,311.
Patented July 9, 1912.
2 SHEETS—SHEET 2.
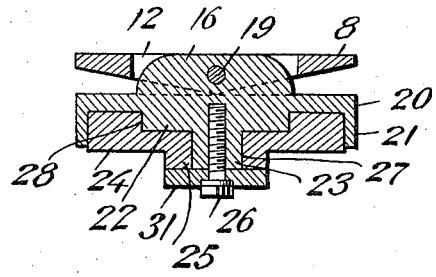
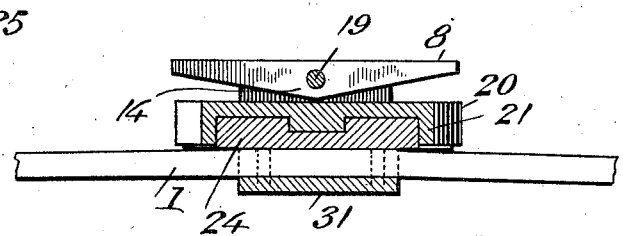
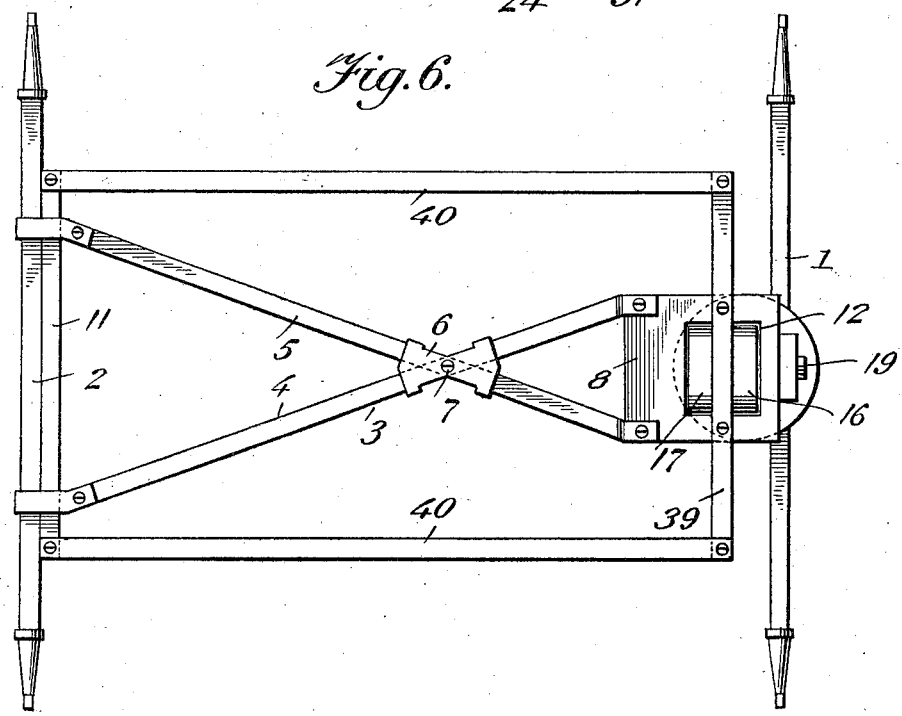
Inventor
Daniel Godfrey Tatum

UNITED STATES PATENT OFFICE.

DANIEL GODFREY TATUM, OF HENDERSONVILLE, NORTH CAROLINA.

RUNNING-GEAR.

1,032,311. Specification of Letters Patent. Patented July 9, 1912.

Application filed May 5, 1911. Serial No. 625,327.

*To all whom it may concern:*

Be it known that I, DANIEL G. TATUM, a citizen of the United States, residing at Hendersonville, in the county of Henderson and State of North Carolina, have invented new and useful Improvements in Running-Gears, of which the following is a specification.

This invention relates to vehicle running gears and the object of the invention is the provision of means whereby the reach may be connected to the axles so as to permit relative lateral movement of the two without strain upon the parts and also to provide an axle coupling which will be substantially nutless.

A further object of the invention is the provision of a running gear which is adapted to receive a frame for supporting side frames or the like, whereby the vehicle may be converted from a front and rear axle spring vehicle to a side spring vehicle.

Further objects of the invention will appear as the following specific description is read in connection with the accompanying drawings, which form a part of this application, and in which:—

Figure 1 is a top plan view. Fig. 2 is a side elevation. Fig. 3 is a section taken on the line 3—3 of Fig. 1. Fig. 4 is a section taken on the line 4—4 of Fig. 1. Fig. 5 is a section taken on the line 5—5 of Fig. 1. Fig. 6 is a top plan view of the device with the spring frame mounted thereon.

Referring more particularly to the drawings, 1 and 2 represent the front and rear axles respectively.

The running gear is shown generally at 3 and comprises a pair of crossed bars 4 and 5 connected together in their longitudinal centers by a clip and screw 6 and 7. The forward ends of these crossed bars are connected to a rocker plate 8 and the rear ends have straps 9 secured thereto by the screws 10, and said straps are adapted to surround the axle 2 or to surround the axle and the rear frame piece 11, which will hereinafter be described. The rocker plate 8 is provided with a pair of slots 12 and upon its under side, intermediate the slots, with a boss 13 which tapers laterally toward opposite sides of the rocker plate and corresponds with a similar boss 14 which is arranged upon the underside at the forward end of the rocker plate. These bosses are transversely apertured so as to aline with apertures 15 in the bosses 16 and 17 which are arranged upon the upper side of the upper fifth wheel member 18. The bosses 16 and 17 lie within the slots 12 and are connected to the bosses 13 and 14 by means of a bolt 19 which passes loosely through the apertures in said bosses 13, 14 and 16 and threads into the boss 17. This arrangement permits lateral rocking of the running gear upon the upper member of the fifth wheel.

The upper member of the fifth wheel comprises a disk 20, an annular flange 21 surrounding the same, and in its center, upon the under side thereof, a central raised table 22 upon the center of which projects a central boss 23. The lower member of the fifth wheel comprises a thickened disk 24 having a central boss 25 arranged upon its under side which is apertured to permit the passage of an attaching screw 26 and is hollowed out or provided with a socket 27 to receive the boss 23. The disk is provided with an annular recess 28 surrounding the socket 27 to receive the table 22, the disk seating within and encompassed by the screw 26 which passes through a hole 30 in the axle attaching plate 31.

Arranged upon the under side of the disk 24 and to one side of the boss 25 are a pair of parallel ribs 32 and 33 which form a groove 34 corresponding with a similar groove 35 in the under side of the attaching plate 31, which grooves are adapted to receive the axle 1, the clamping plate being held down by screws 36 which pass through the plate 31 and are threaded into the ribs 32 and 33. The front and rear springs 37 and 38 are shown connected to the forward portion of the rocking plate 8 and to the straps 9 respectively.

In the structure shown in Fig. 6, the cross bar 11 is passed through the straps and lies alongside of the axle 2. A similar cross bar is secured to the upper side of the rocking plate 8 between the notches 12 and secured to these cross bars 11 and 39 are longitudinal spring supports 40 upon which springs may be mounted such as are used in sidebar buggies.

Having thus described the invention, what I claim as new is:—

In a running gear, the combination with a fifth wheel member, lugs raised from the upper surface and arranged in spaced parallel relation, a second fifth wheel member having a pair of spaced ribs on its under side, means to secure the fifth wheel members together for relative rotation, a recessed attaching plate secured to the second fifth wheel member, an axle secured to the second fifth wheel member by said attaching plate and lying in said recess and between said ribs, a slotted rocker plate having depending lugs arranged between the slots, a pivot bolt passing through said lugs and the lugs on the first fifth wheel member for pivotally connecting the rocker plate to the fifth wheel members, said rocker plate adapted to pivot at right angles to the rotation of the fifth wheel members, and a reach secured to the rocker plate.

In testimony whereof I affix my signature in presence of two witnesses.

DANIEL GODFREY TATUM.

Witnesses:
W. F. EDWARDS,
C. S. FULLBRIGHT.

Copies of this patent may be obtained for five cents each, by addressing the "Commissioner of Patents, Washington, D. C."